United States Patent
Morishima et al.

(10) Patent No.: US 6,446,833 B1
(45) Date of Patent: Sep. 10, 2002

(54) AUTOMATIC NUT FEEDING DEVICE

(75) Inventors: Kenichi Morishima; Yukinori Fujimoto, both of Aichi-ken (JP)

(73) Assignee: Aoyama Seisakusho Co., Ltd., Nagoya (JP)

(*) Notice: Subject to any disclaimer, the term of this patent is extended or adjusted under 35 U.S.C. 154(b) by 0 days.

(21) Appl. No.: 09/635,012

(22) Filed: Aug. 9, 2000

(30) Foreign Application Priority Data

Aug. 20, 1999 (JP) ............................................. 11-233347

(51) Int. Cl.[7] ............................................... B65G 59/00
(52) U.S. Cl. .......................................... 221/268; 29/798
(58) Field of Search ............................. 221/1, 2, 7, 266, 221/92, 258, 268, 271; 29/706, 798, 818

(56) References Cited

U.S. PATENT DOCUMENTS 4,164,072 A  8/1979  Shinjo

FOREIGN PATENT DOCUMENTS

| DE | 44 10 245 A | 11/1994 |
|---|---|---|
| DE | 43 40 642 A | 6/1995 |
| EP | 0 703 037 | 3/1996 |
| JP | 04-87737 | 3/1992 |
| JP | 06-726 | 1/1994 |
| WO | 95 11770 A | 5/1995 |
| WO | WO 95/11770 | * 5/1995 |

OTHER PUBLICATIONS

Patent Abstracts of Japan, vol. 1996, No. 5, May 31, 1996 and JP 08 001353 A (Yoshitaka Aoyama), Jan. 9, 1996.

* cited by examiner

Primary Examiner—Kenneth W. Noland
(74) Attorney, Agent, or Firm—Frishauf, Holtz, Goodman & Chick, P.C.

(57) ABSTRACT

There is disclosed an automatic nut feeding device comprising a body provided on a side surface thereof with a nut feeding hole, and a spring-plunger type conduction sensor mounted on a side of the body opposite to the nut feeding hole therein and adapted to be pushed by a nut, which is passed through the nut feeding hole to be fed into the body while laterally sliding.

10 Claims, 4 Drawing Sheets

AUTOMATIC NUT FEEDING DEVICE

BACKGROUND OF THE INVENTION

The invention relates to an automatic nut feeding device used in a manufacturing line for automobiles or the like.

Automatic feeding devices for nuts such as pierce nuts, caulking nuts, weld nuts or the like are provided with a body for temporarily holding a nut, which is passed through a nut feeding hole via a chute by means of pneumatic pressure or the like to be successively fed into the body while laterally sliding. FIG. 4 is a cross sectional view showing a general construction of such a device, and the reference numeral 1 designates a body, 2 a nut feeding hole formed on one side of the body, 3 a vertical hole, through which a punch (not shown) for striking a nut N passes, and 4 an opening and closing member for temporarily holding a nut N until striking. A nut N fed to an interior of the body 1 from the nut feeding hole 2 is temporarily held on the opening and closing member 4, and when a punch descends through the vertical hole 3, the opening and closing member 4 is simultaneously opened to permit the nut N to be struck into a mating member.

In the case where the nut N is not correctly fed to the interior of the body 1 for some reasons, however, the punch when being made to descend performs lost striking to cause various troubles. Conventionally, a sensor pin 5 for detecting a nut N is mounted on a side opposite to the nut feeding hole 2 in the body 1 as shown in FIG. 4.

The sensor pin 5 is metallic and provided with a lead wire 6 for electrically detecting contact of the nut N as shown in the figure. The sensor pin 5 is insulated at its periphery by a covering tube 7 of rubber, and is fixed in the body 1 by means of a bonding agent 8 after being positioned so as to be capable of detecting that the nut N has been correctly fed. Also, a surface of the sensor pin for contact with the nut N is fixed by the bonding agent 8 and then finished by means of electric spark machining.

Because the sensor pin 5 gets a shock repeatedly each time the nut N abuts against the pin, however, the sensor pin 5 is slightly shifted in position after use over a long term, and so there is the possibility that a nut N cannot be correctly detected when such shift becomes great. Such trouble will give rise to stoppage of a manufacturing line to cause a heavy damage.

Also, there has been involved a problem that since the sensor pin 5 is insulated at its periphery by the covering tube 7 of rubber, it is not easy even for a new sensor pin to be mounted correctly in a position where it contacts with a nut N fed at a predetermined position and it is difficult to repairingly correct a position of the sensor pin 5, which is displaced in position during use. Further, manufacturing cost is high since the sensor pin 5 is finished by means of electric spark machining after being fixed by the bonding agent 8.

SUMMARY OF THE INVENTION

The invention solves the above-mentioned problems of the prior device and provides an automatic nut feeding device, in which failure in detection is not caused even after use over a long term, mounting of a sensor is easy, and manufacturing cost can be reduced relative to the prior device.

To solve the above-mentioned problems, the automatic nut feeding device of the invention has a feature in comprising a body provided on a side surface thereof with a nut feeding hole, and a spring plunger type conduction sensor mounted on a side of the body opposite to the nut feeding hole therein and adapted to be pushed by a nut, which is passed through the nut feeding hole to be fed into the body while laterally sliding. In addition, the automatic nut feeding device of the invention may further comprise a spring-retainer type sensor pin provided on a front surface of the spring plunger type conduction sensor and adapted to be pushed by a nut as fed.

The automatic nut feeding device of the invention is constructed such that a spring plunger type conduction sensor is mounted in an interior of a body by means of a screw, so that even when repeatedly given a shock, a spring absorbs the shock and so the sensor is free of positional displacement. Also, the device can correctly detect a nut even when the sensor is mounted with rough positional accuracy, and the device is easy to repair and can be reduced in manufacturing cost.

In addition, it is possible to use the disclosure of EP 0 703 037 A1 of the present applicant as an apparatus for successively supplying nuts to the body and striking the same into a member, into which nuts are to be struck. Therefore, European Patent Publication No. EP 0 703 037 A1, the disclosure of which is herein incorporated by reference, discloses an apparatus for continuously feeding and driving nuts, in which nuts are arranged so as to be made postures thereof to be vertically right, and a predetermined number of nuts are intermittently transported and provided through a nut feeding hole to be fed into a body of this specification while laterally sliding.

DESCRIPTION OF THE PREFERRED EMBODIMENTS

Figure 4:
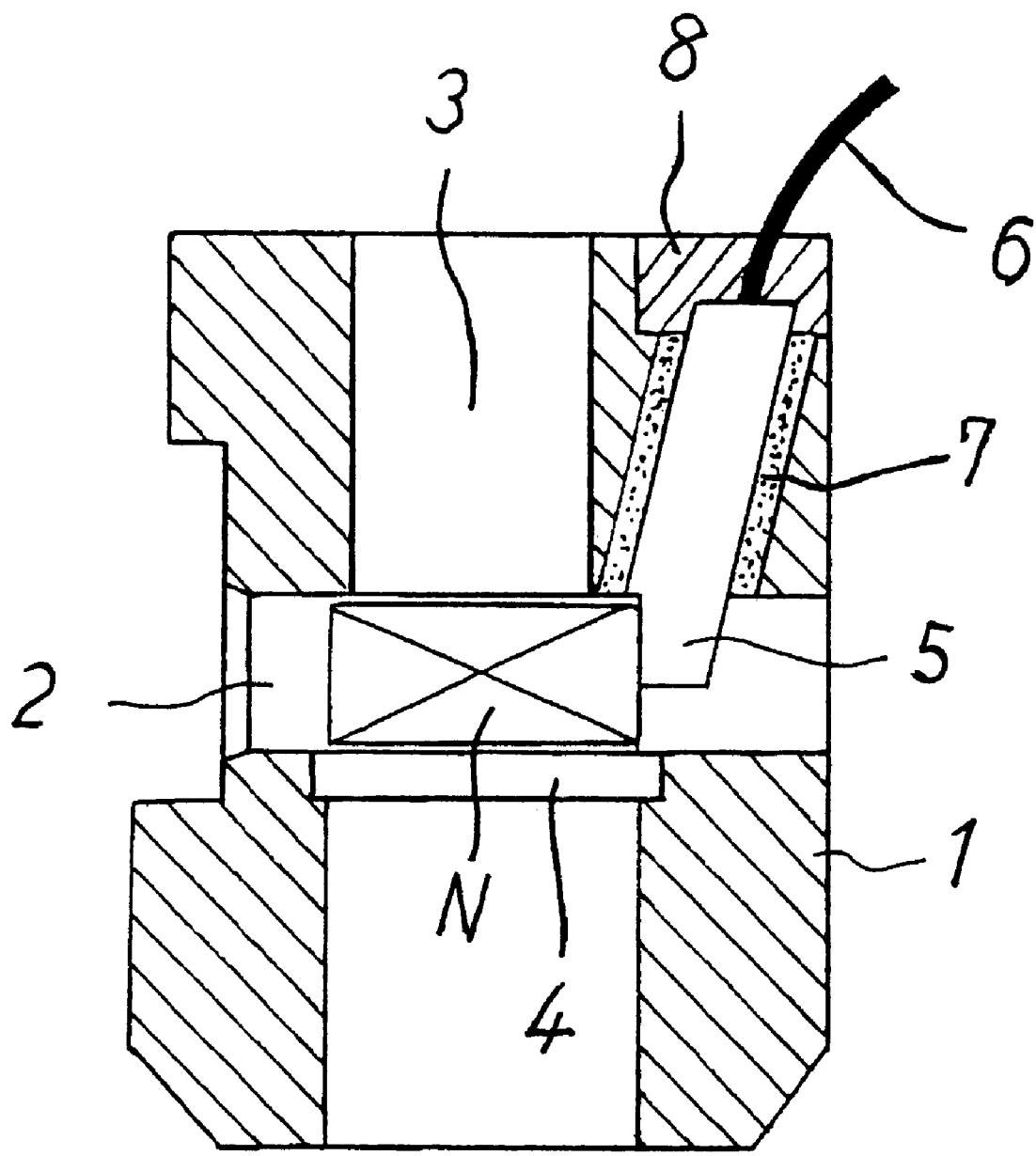
FIG. 4 is a longitudinal, cross sectional view showing a prior device.

The invention will be described in detail with reference to the accompanying drawings, in which preferred embodiments of the invention are shown. In addition, parts or members designated by the same reference numerals as those in FIG. 4 function in the same manner as those in FIG. 4.

Figure 1:
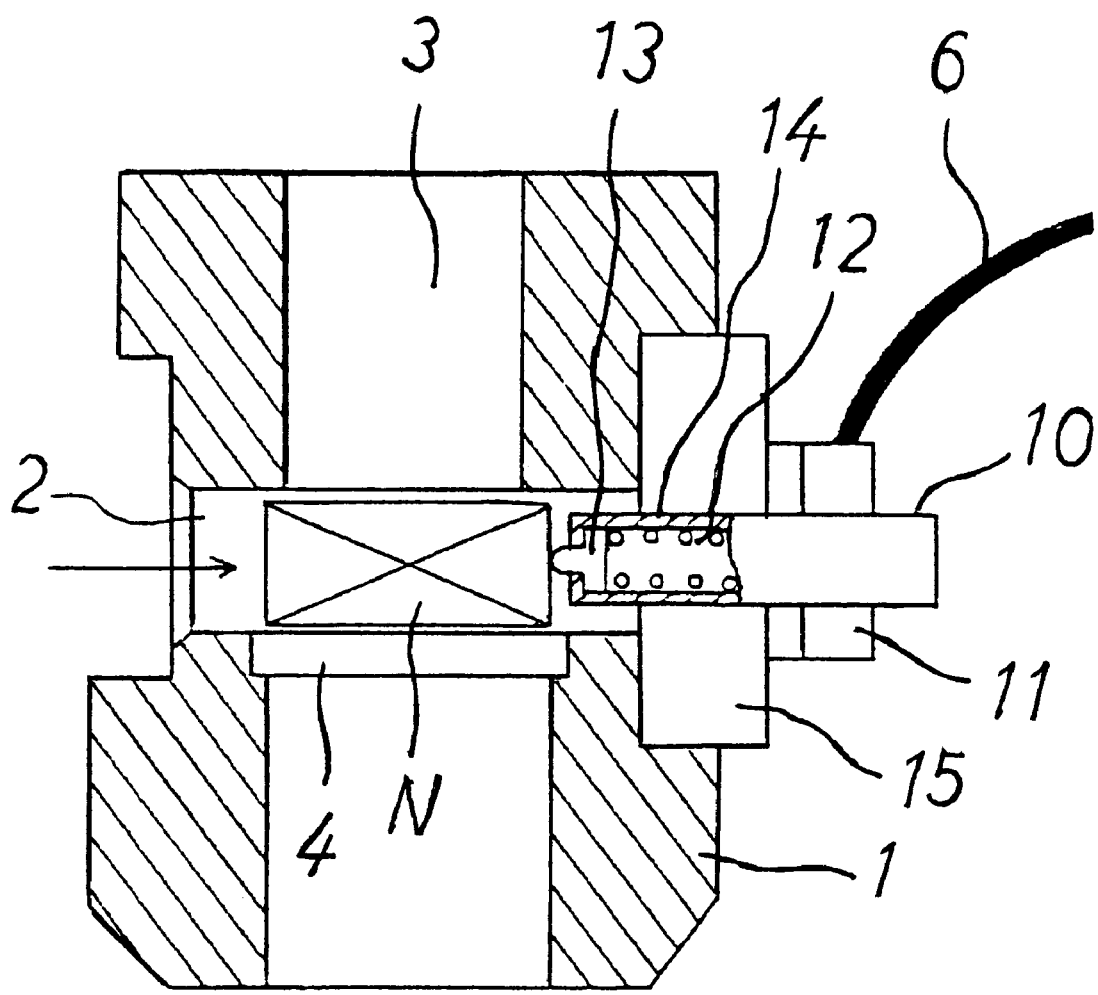
FIG. 1 is a longitudinal, cross sectional view showing a first embodiment of the invention.
Figure 2:
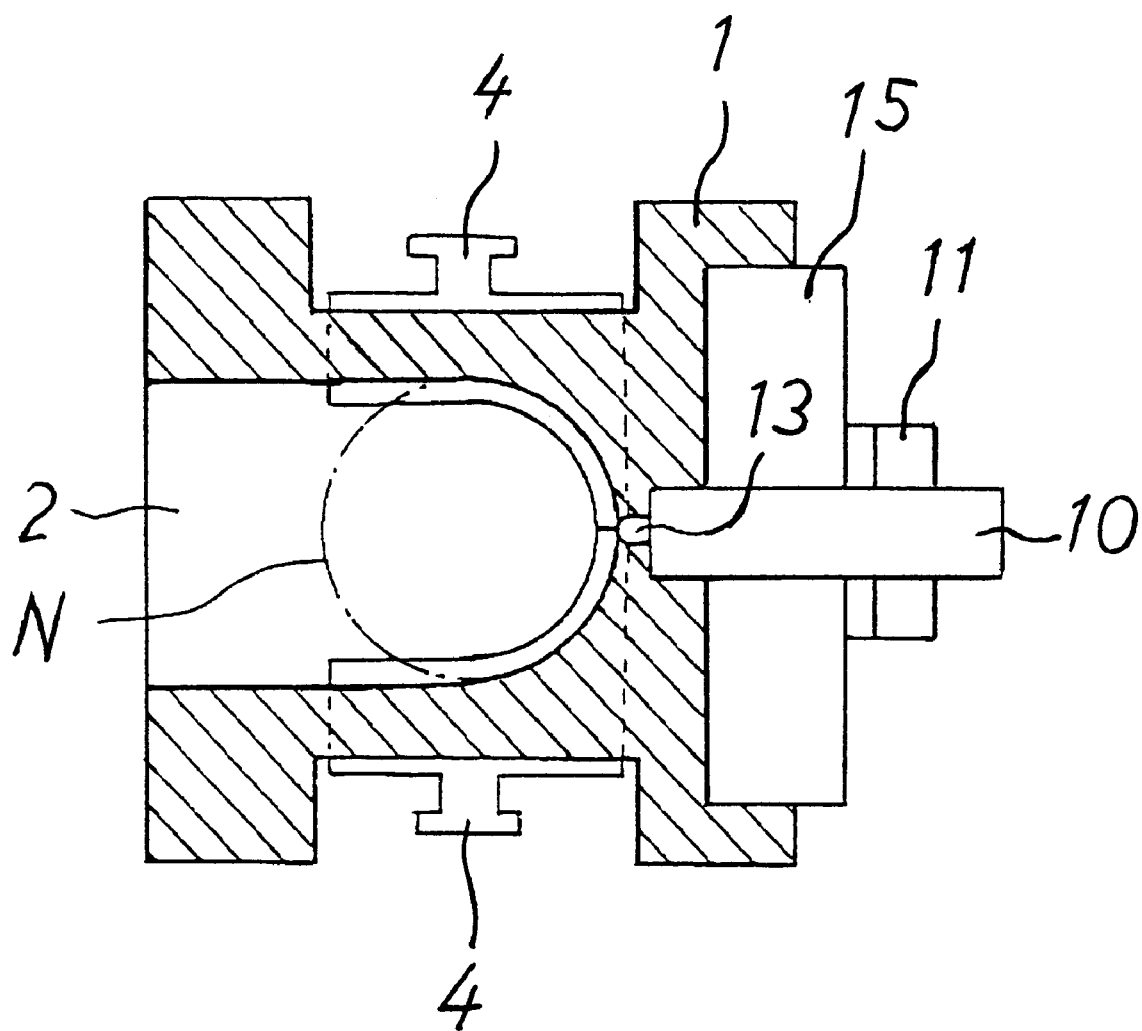
FIG. 2 is a horizontal, cross sectional view showing the first embodiment of the invention shown in FIG. 1.

FIG. 1 is a cross sectional view showing a first embodiment, and FIG. 2 is a horizontal, cross sectional view showing the first embodiment. Like the prior device, the reference numeral 1 designates a metallic body, 2 a nut feeding hole formed on a side of the body, 3 a vertical hole, through which a punch ascends and descends, and 4 an opening and closing member for temporarily holding a nut N as fed. A spring-plunger type conduction sensor 10 is secured by a screw 11 on a side opposite to the nut feeding hole 2 in the body 1.

The conduction sensor 10 comprises a plunger 13 received in a vessel 14 and biased toward a tip end thereof by a spring 12. A resin plate 15 is used to mount the vessel 14 for the conduction sensor 10 to the metallic body 1 in an insulating condition. Since the plunger 13 is metallic and is put in electrically conductive contact when brought into contact with the nut N (with the nut N being kept in a conductive condition with the metallic body 1 at all times), however, the conduction sensor 10 can electrically detect whether or not the nut N contacts with the plunger 13.

Because such spring-plunger type conduction sensor 10 supports the plunger 13 by means of the spring 12, the spring 12 can absorb a shock given to the conduction sensor 10 by the nut N, which is fed through the nut feeding hole 2 by means of pneumatic pressure while laterally sliding in the body. Besides, the conduction sensor 10 is fixed to the resin plate 15 and mounted to the body 1. Therefore, the sensor is free of positional displacement even when repeatedly given a shock by the nut N, and is easy to be corrected in a mount position if positional displacement would be caused.

Also, since the spring-plunger type conduction sensor 10 has the spring 12 projecting the plunger 13 toward a tip end of the vessel 14 at all times, a nut N can be correctly detected even when the sensor is mounted with rough positional accuracy. Accordingly, there is no possibility of failure in detection even after use over a long term, and any serious trouble such as stoppage of a manufacturing line or the like will not be resulted.

Figure 3:
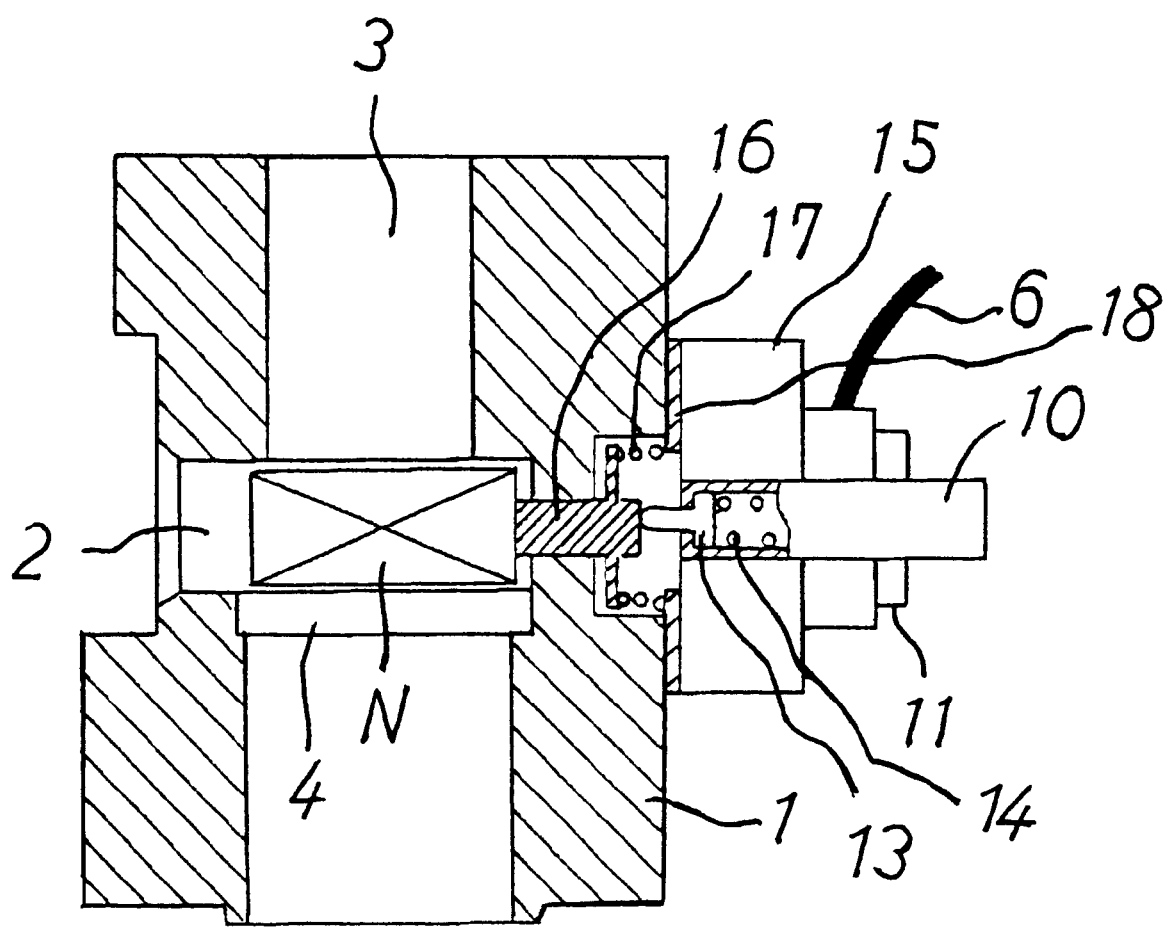
FIG. 3 is a longitudinal, cross sectional view showing a second embodiment of the invention.

With the first embodiment described above, the plunger 13 in the conduction sensor 10 is brought into direct contact with a nut N to thereby perform detection of the same. In the case where an outer peripheral surface of a nut N is coated with a resin, the above measure is incapable of detection because electric conduction cannot be established. In the case where a nut N is of insulating nature, a spring-retainer type sensor pin 16 adapted to be pushed by the nut N as fed is provided on a front surface of the conduction sensor 10 as in the second embodiment shown in FIG. 3.

While the sensor pin 16 is biased forward by a spring 17 at all times, the sensor pin 16 is retreated against the bias of the spring 17 when a nut N is fed to a predetermined position, so that a rear end of the sensor pin 16 is brought into contact with the plunger 13 in the conduction sensor 10. In addition, a rear end of the spring 17 is supported on a metallic plate 18 on an outer surface of the body 1. Because the sensor pin 16 is kept in an electrically conductive condition with the body 1 at all times, the conduction sensor 10 can be made operative as in the first embodiment provided that the sensor pin 16 is brought into contact with the conduction sensor 10 even in the case of a nut N being of insulating nature.

As described above, the automatic nut feeding device according to the invention employs a spring-plunger type conduction sensor and so offers many advantages that failure in detection is not caused even after use over a long term, a nut can be correctly detected even when positional accuracy in mounting is somewhat rough, correction of position and repair such as exchanging of parts and so on are easy, and manufacturing cost can be lowered.

What is claimed is:

1. An automatic nut feeding device comprising:

a body provided on a side surface thereof with a nut feeding hole, and a spring-plunger type conduction sensor mounted on a side of the body opposite to the nut feeding hole, wherein the spring-plunger type conduction sensor is adapted to be pushed by a nut that is passed through the nut feeding hole and fed into the body by laterally sliding.

2. The automatic nut feeding device according to claim 1, further comprising:

a spring-retainer type sensor pin provided on a front surface of the spring-plunger type conduction sensor, wherein the spring-retainer type sensor pin is adapted to be pushed by a fed nut.

3. The automatic nut feeding device according to claim 1, wherein the spring-plunger type conduction sensor comprises a plunger that is received in a vessel and that is biased toward a tip end of the vessel by a spring.

4. The automatic nut feeding device according to claim 3, wherein the plunger is metallic and is put in electrically conductive contact when brought into contact with a fed nut.

5. The automatic nut feeding device according to claim 4, wherein the body is metallic, and the vessel is mounted in the body in an insulating condition by a resin plate.

6. The automatic nut feeding device according to claim 1, wherein the nut feeding hole is adapted to receive a nut fed by pneumatic pressure.

7. The automatic nut feeding device according to claim 2, wherein the spring-retainer type sensor pin is biased forward by a spring and is adapted to be retreated against the bias of the spring when a nut is fed to a predetermined position.

8. The automatic nut feeding device according to claim 7, wherein a rear end of the spring is supported on a metallic plate on an outer surface of the body, and the spring-retainer type sensor pin is kept in an electrically conductive condition with the body at all times.

9. The automatic nut feeding device according to claim 8, wherein the spring-plunger type conduction sensor is put in electrically conductive contact when the spring-retainer type sensor pin is retreated against the bias of the spring and a rear end of the spring-retainer type sensor pin is brought into contact with the spring-plunger type conduction sensor, even if a fed nut is made of an insulating material.

10. An automatic nut feeding device comprising:

a body provided on a side surface thereof with a nut feeding hole, a spring-plunger type conduction sensor mounted on a side of the body opposite to the nut feeding hole, and a spring-retainer type sensor pin provided on a front surface of the spring-plunger type conduction sensor, wherein the spring-retainer type sensor pin is adapted to be pushed by a nut that is passed through the nut feeding hole and fed into the body, and to in turn push the spring-plunger type conduction sensor.

* * * * *